United States Patent [19]

Poulsen et al.

[11] 4,025,389

[45] May 24, 1977

[54] PROCESS AND ISOMERIZING GLUCOSE

[75] Inventors: Poul Borge Rosenius Poulsen, Vaerlose; Lena Elisabeth Zittan, Kokkedal, both of Denmark

[73] Assignee: Novo Industri A/S, Bagsvaerd, Denmark

[22] Filed: Feb. 27, 1976

[21] Appl. No.: 662,271

Related U.S. Application Data

[63] Continuation-in-part of Ser. No. 558,001, March 13, 1975, abandoned.

[52] U.S. Cl. .............................. 195/31 F; 195/115; 195/DIG. 11

[51] Int. Cl.[2] .............................. C12D 13/00

[58] Field of Search .................. 195/31 F, 66 R, 62, 195/65, 114, 115, 63, 68, DIG. 11

[56] References Cited

UNITED STATES PATENTS

| | | | |
|---|---|---|---|
| 3,694,314 | 9/1972 | Lloyd et al. | 195/31 F |
| 3,753,858 | 8/1973 | Takasaki et al. | 195/31 F |
| 3,779,869 | 12/1973 | Zienty | 195/68 |
| 3,821,086 | 6/1974 | Lee et al. | 195/31 F |
| 3,843,442 | 10/1974 | Moskowitz | 195/31 F |
| 3,868,304 | 2/1975 | Messing | 195/31 F |
| 3,979,261 | 9/1976 | Outtrup | 195/65 |
| 3,980,521 | 9/1976 | Amotz et al. | 195/68 |

OTHER PUBLICATIONS

Geyer, "Glucose Isomerase — New Possibilites for the Starch and Food Industry," *Die Starke*, vol. 26, No. 7, pp. 225–232 (1974).

Yoshimura et al. "Studies on D–Glucose Isomerizing Activity of D–Xylose Grown Cells from *Bacillus coagulans*, strain HN–68," *Agr. Biol. Chem.*, vol. 30, No. 10, pp. 1015–1023 (1966).

Danno et al., "Studies on D–Glucose–isomerizing Activity of D–Xylose–Grown Cells from *Bacillus coagulans*, Strain HN–88," *Agr. Biol. Chem.*, vol. 31, No. 3, (1967) pp. 284–292.

*Primary Examiner*—Alvin E. Tanenholtz
*Assistant Examiner*—Thomas G. Wiseman
*Attorney, Agent, or Firm*—Fidelman, Wolffe & Waldron

[57] ABSTRACT

Continuous enzymatic isomerization of a glucose syrup with a glucose concentration of 30–55% by weight containing less than about $10^{-3}$M calcium, less than about $10^{-2}$M of $Mg^{++}$, the $Mg^{++}$ being in a concentration, whereby the molar ratio of magnesium to calcium is greater than 5, the isomerization taking place at a pH 7.8–8.6 with a total contact time between enzyme and syrup less than about 3.5 hours, preferably less than 2 hours. A convenient temperature range for isomerization is 60°–85° C., preferably 60°–70° C. The syrup has no colbalt added thereto. A preferred practice involves a syrup with very little added magnesium. Post isomerization ion exchange treatment can be avoided.

The enzyme is a particulate preparation derived from *B. coagulans*, preferably by glutaraldehyde reaction with homogenized microorganism cells.

9 Claims, No Drawings

PROCESS AND ISOMERIZING GLUCOSE

This application is a continuation in part of Ser. No. 558,001, filed Mar. 13, 1975 now, abandoned.

INTRODUCTION

The present invention is particularly directed to a continuous glucose isomerization procedure characterized by low processing costs.

Virtually all glucose isomerases known to the art are cobalt activated, a factor which adds significantly to syrup conversion costs because any cobalt added to incoming glucose syrup must be removed from the product glucose-fructose by relatively high cost ion exchange techniques.

An indepth study made on the glucose isomerase from *B. coagulans* (see Danno et al, Agriculture Biologic Chem. Vol. 31, No. 3, 1967, pp. 284–292) reported that maximal activity for the enzyme was observed when cobalt ion concentration in the glucose syrup was approximately $10^{-3}$M and suggested a somewhat higher concentration for crude enzyme preparations. The majority of the patent art subsequent to the date of that study appears to have adopted such use levels for cobalt requiring enzymes, regardless of the microorganism source. Since the cobalt ion added to the incoming glucose syrup must ultimately be removed from the product glucose-fructose syrup (by ion exchangers), any realistic reduction in the amount of cobalt added to the entering syrup reflects in a substantial reduction in the cost of purifying the product syrup.

Activity of the *B. coagulans* enzyme is also known to be affected by the magnesium-ion content of the syrup, and indeed a high magnesium content in the syrup has commonly been employed by the art, e.g. $10^{-2}$M, regardless of the enzyme source. Typically, a glucose syrup undergoing enzymatic isomerization according to prior art practices would contain $10^{-3}$M $Co^{++}$ and $10^{-2}$M $Mg^{++}$.

The post-treatment purification of the syrup is normally designed to remove magnesium as well as cobalt. However, since magnesium is a normal non-toxic constituent of foods, virtual absence of magnesium is not required.

To repeat, any significant reduction in cobalt usage is reflected into materially lower processing costs. Reduction in magnesium usage will also reflect in lower processing costs. According to the invention $Co^{++}$ is not used at all, and according to preferred practice of this invention magnesium addition usage is reduced considerably.

STATEMENT OF THE INVENTION

The method of this invention comprises an enzymatic isomerization of a glucose syrup with a concentration of 30–55% by weight of glucose containing less than about $10^{-3}$M of $Ca^{++}$, no $Co^{++}$, less than about $10^{-2}$M of $Mg^{++}$, and preferably less than $5 \times 10^{-4}$M, the conversion being carried out at pH 7.8–8.6 with a total contact time between enzyme and syrup less than about 3.5 hours, preferably less than 2 hours. A preferred practice involves treatment with so little added magnesium that post isomerization ion exchange can be avoided. A convenient temperature range for isomerization varies between 60° and 85° C., 60° to 70° C. being preferred

RATIONALE OF THE INVENTION

Glucose isomerases from *B. coagulans* have been intensively investigated in effort to obtain enzyme preparations with sufficiently long half lives for continuous industrial process, and exhibiting high unit activity. Extended life, high activity glucose isomerases derived from *B. coagulans* cells are now available to the art. For a preferred mode of particulate enzyme preparation suited to practice of this invention, reference is made to the enzyme products described in copending application Ser. No. 501,292, filed Aug. 28, 1974, now U.S. Pat. No. 3,980,521, which enzyme preparations are glutaraldehyde cross-linked *B. coagulans* microorganism cells that have been subjected to substantial disruption. Preferably the enzyme preparation is formed from cells that have been homogenized prior to reaction with glutaraldehyde.

*B. coagulans* is a poorly defined species with numerous known varients. One varient productive of a superior glucose isomerase is characterized by an ability to grow solely on inorganic sources of nitrogen as the nitrogen nutrient. For detailed disclosure of this enzyme and its source microorganism reference is made to Ser. No. 428,682, filed Dec. 27, 1973, now U.S. Pat. No. 3,979,261.

It has now been discovered that the biochemical needs of the immobilized *B. coagulans* glucose isomerase enzymes for cobalt may remain completely satisfied without any cobalt supplementation during the course fof isomerization. Actually it has been found that by omitting $Co^{++}$ from the glucose syrup the productivity of the isomerization process and the stability of the enzyme are not impaired and in some cases improved.

As already mentioned, it has been discovered also that the biochemical needs of glucose isomerase enzyme for magnesium are much lower than had been believed heretofore. As a matter of fact, the addition of $Mg^{++}$ may be avoided altogether, if the concentration of $Ca^{++}$ is low. The activation needs of the glucose isomerase for $Mg^{++}$ is fully satisfied at pH 7.8 or higher by less than $10^{-3}$M of $Mg^{++}$.

However, calcium ions in the syrup are inhibitory, perhaps more so than had been appreciated heretofore. Apparently the $Mg^{++}$ in the syrup acts mostly to counter $Ca^{++}$ inhibition. A low calcium content in the syrup allows reduction in the magnesium content. The $Mg^{++}/Ca^{++}$ ratio in the syrup should exceed 5:1 on a molar basis, preferably the ratio should exceed 10:1, but not 500:1, if $Mg^{++} > 10^{-3}$M.

Conduct of an enzymatic glucose isomerization reaction at above about pH 8.0 is however contrary to usual practices of isomerizing at pH below about pH 8.0 in order to reduce color formation. Removal of color from the product syrup, e.g. by treatment with activated carbon, adds to the processing expense. Minimizing color formation is highly desirable. Unfortunately, the rate of color formation in the glucose syrup increases with increasing pH.

Investigation of the color forming propensity revealed that the rate of color formation at all pH levels is some function of time. In short, the higher color formation rate at pH $8.0^{+}$ may be countered by carrying out the isomerization more quickly. Limiting the total holding or contact time of the glucose syrup in the enzymatic conversion reactor to below about 3.5 hours produces a product syrup of acceptable color. If contact time is limited to less than 1 hour, color cleanup treatment of the product syrup might become unnecessary, and furthermore, presence of psicose and other by-products cannot be determined by thin layer chromatography (Sven Åge Hansen, TLC method for the identification of mono, di and trisaccharides, Journal of Chromatography, in press).

Practice of this invention offers possibilities for operating so that:

1. no $Co^{++}$ is added in connection with the isomerization;
2. no $Mg^{++}$ needs to be added in connection with the isomerization;
3. no ion exchange is needed after the isomerization to remove detrimental ions;
4. the enzyme exhibits excellent thermostability;
5. the productivity of the process is improved; and
6. the process is well suited for continuous column operation; the pressure drop per unit length of column is low.

DETAILED PRACTICE OF THE INVENTION

The process of the invention involves conducting an isomerization treatment of glucose syrup as a continuous operation with a syrup inlet pH in the range of 7.8–8.6 with a contact time of less then about 3.5 hours, preferably less than 2 hours. In the continuous process a 30–55% w/w glucose syrup is converted to a product syrup containing a desired fructose level of at least 40%, usually about 45%. The conversion temperatures are in the range of 60°–85° C., preferably 60°–70° C. The pH range of 7.8–8.6 in the entering feed syrup is maintained by adjustment with alkali (NaOH or $Na_2Co_3$) and if necessary by readjusting at selected points in the conversion reactor. The pH of the isomerized outlet syrup is lower than the pH of inlet syrup. Ordinarily the difference between the entering syrup pH and the outlet syrup pH is between 0.2 and 0.6. The pH control is important to practice of the invention. If the pH is too high, e.g. higher than about 8.6, undesired color formation occurs (if contact time is long). If pH is too low, e.g. lower than 7.6, $Co^{++}$ addition is needed to maintain enzyme activity. Over and above these two effects the variation of enzyme activity with pH has to be considered; the pH optimum for the *B. coagulans* enzyme is around 8.5. An industrially performed batch process normally is carried out with extended contact times due to use of relatively low enzyme concentrations. For that reason the pH must be kept low in order to avoid color formation, and activity of the enzyme at such a pH is considerably lower than at the optimum pH. $Co^{++}$ addition is required. In a continuous process according to the present invention, contact time can be kept low, and the pH can be high. The isomerization can be performed at or very near the optimum pH of the enzyme. $Co^{++}$ can be avoided. Thus a continuous process according to the present invention has several advantages over a batch process.

The quantity of $Mg^{++}$ added to the feed syrup is less than about $10^{-2}$M, preferably less than $5 \times 10^{-4}$M. However, to allow low $Mg^{++}$ levels the calcium content of the feed syrup must be controlled to below about $10^{-4}$M, which for example may be done by forming the syrup from low calcium water, or by appropriate pretreatment of the glucose syrup to limit calcium to below $2.5 \times 10^{-5}$m. In any event, when calcium is present, sufficient magnesium is added to the syrup to overbalance the calcium content thereof, to in excess of a molar ratio of $Mg^{++}/Ca^{++}$ of 5:1, preferably in excess of a molar ratio of $Mg^{++}/Ca^{++}$ of 10:1.

In total the content of both $Mg^{++}$ and $Ca^{++}$ are controlled and related, by ion exchange removal of $Ca^{++}$ from the glucose syrup, if necessary, to avoid more than $10^{-3}$M $Ca^{++}$ and $10^{-2}$M $Mg^{++}$. If the glucose syrup contains a lower concentration of $Ca^{++}$, the quantity of $Mg^{++}$ added may be decreased in an appropriate proportion such that $Mg^{++} : Ca^{++}$ remains within the interval 5–500 for $Mg^{++} > 10^{-3}$M and is higher than 5 for $Mg^{++} \leq 10^{-3}$M. Thus in a preferred embodiment of this invention the syrups will contain less than $2.5 \times 10^{-5}$M $Ca^{++}$ and $5 \times 10^{-4}$M $Mg^{++}$. As a practical matter the glucose syrups to which this invention is directed are derived from a starch hydrolyzate. Often preparation of the syrup commences by suspending starch in a tap water of some hardness, and therefore some $Ca^{++}$ is present.

Frequently starch hydrolysis and saccharification of the starch hydrolyzate are carried out enzymatically, using $Ca^{++}$ activated enzymes. In short $Ca^{++}$ is rarely absent from glucose syrups (other than those prepared in a laboratory directly from crystalline dextrose with deionized water), and care must be taken to prevent the $Ca^{++}$ content from exceeding $10^{-3}$M $Ca^{++}$.

In continuous isomerization processes according to the invention, the particle size of the enzyme preparation will be determined by the syrup treatment conditions (and equipment). For column operation, which is a preferred mode of this invention, particles above about 100 microns are preferred (since the column tends to clog if smaller particles are employed). Shallow bed procedures (e.g. isomerization in a filter press reactor) may employ any particle size. However, since the unit activity of the enzyme preparation may be some function of particle size, the particle size used for the isomerization process can be a factor in the efficiency of a particular procedure (or equipment). In any event, the enzyme preparations disclosed by copending application Ser. No. 501, 292, filed Aug. 28, 1974, now U.S. Pat. No. 3,980,521, can be prepared in desired particle sizes.

For further understanding of the practice of this invention, reference is made to the following specific examples, wherein the activity of the immobilized enzyme is measured in IGIC units (Immobilized Glucose Isomerase Column process). 1 IGIC is defined as the amount of enzyme which converts glucose to fructose with an initial rate of 1$\mu$/mole/min, under standard conditions, which are 40 w/w% glucose, pH 8.5 in inlet, 65° C. and $4 \times 10^{-3}$M $Mg^{++}$, no $Ca^{++}$; in a continuous packed bed column; column size: 2.5cm × 40cm.

In the examples the productivity of the enzyme in a given time (hours) is defined as the amount of glucose in kg which can be converted to a mixture of fructose and glucose with a conversion degree of 0.45 per kg enzyme of initial activity 100 IGIC/g.

The enzyme preparations employed had an activity of between 150 and 250 IGIC per g. In order to compare results from preparations with different activity all productivity values were recalculated to refer to an enzyme activity of 100 IGIC/g.

In the examples the contact time is referred to a preparation with an activity of 100 IGIC/g. For instance, a contact time of 1 hour with an enzyme preparation of an activity of 200 IGIC/g corresponds to a contact time of 2 hours with a standard preparation of an activity of 100 IGIC/g.

EXAMPLE 1

Isomerization in presence and absence of Co.

All isomerizations were performed as continuous packed bed plug flow reactions. The *B. coagulans* enzyme was prepared according to Example 2 in Ser. No. 501,292, now U.W. Pat. No. 3,980,521. The particle size varied between 150μ and 2800μ. This enzyme preparation was presoaked in 40 weight % glucose syrup at room temperature for 1 hour. This presoaked glucose isomerase was packed in different water jacketed columns. A current of glucose syrup having the concentration, pH and other characterizing data thereof according to the following table was sent upward through the enzyme material. The flow rate was adjusted to give an output syrup conversion of 45%. The linear flow rate always exceeds 10 cm/hour (film diffusion limit). The $Ca^{++}$ concentration in this example was below $2.5 \times 10^{-5}$M.

TABLE 1A

| Run | Temp.,° C | Glucose conc.w/w | pH in feed | $Co^{++}$ added,M | $Mg^{++}$ added,M |
|---|---|---|---|---|---|
| I | 60 | 40% | 8.5 | 0 | $8 \times 10^{-3}$ |
| II | 60 | 40% | 8.5 | $3.5 \times 10^{-4}$ | $8 \times 10^{-3}$ |
| III | 65 | 40% | 8.5 | 0 | $8 \times 10^{-3}$ |
| IV | 65 | 40% | 8.5 | $3.5 \times 10^{-4}$ | $8 \times 10^{-3}$ |
| V | 65 | 40% | 7.6 | 0 | $8 \times 10^{-3}$ |
| VI | 65 | 40% | 7.6 | $3.5 \times 10^{-4}$ | $8 \times 10^{-3}$ |

Different sizes of columns were used, i.e. columns of sizes (1.5 cm × 35 cm) and (5.8 cm × 45 cm), whereby the first dimension refers to the diameter and the second to the height of the column. For the sake of brevity the columns are hereafter referred to as 60 ml and 1 l columns respectively. 9 g of enzyme was packed in the 60 ml column and 225 g of enzyme in the 1 l column.

All isomerizations were continued for 450 hours. Thereafter the residual activity was measured, and the productivity per 100 IGIC/g and the contact time per 100 IGIC/g were calculated. The results are shown in the following table:

TABLE 1B

| Column | Performance | I | II | III | IV | V | VI |
|---|---|---|---|---|---|---|---|
| 60 ml | Productivity per 100 IGIC/g | 340 | 315 | 420 | 375 | 395 | 410 |
| | Residual activity | 65% | 60% | 52% | 42% | 28% | 41% |
| | Contact time per 100 IGIC/g, min | 90–140 | 90–150 | 75–145 | 75–180 | 75–270 | 75–185 |
| 1 l | Productivity per 100 IGIC/g | 350 | 320 | 440 | 370 | 400 | 415 |
| | Residual activity | 69% | 59% | 60% | 45% | 44% | 46% |
| | Contact time per 100 IGIC/g, min | 90–130 | 90–155 | 75–125 | 75–170 | 75–170 | 75–170 |

In the above table (and in similar tables which follow) where more than one value for the contact time are given the first figure corresponds to the beginning of the run with high activity and the last figure corresponds to the end of the run with a somewhat lower activity.

The following conclusions can be drawn from the above table:

1. The productivity per 100 IGIC/g and the residual activity are better without Co than with Co when pH is maintained at the recommended level.
2. When pH is below the recommended level, the productivity per 100 IGIC/g and the residual activity are better with Co than without Co, but the values with Co are smaller than the values obtained without Co and with a pH inside the recommended level.

EXAMPLE 2

Isomerization in presence and absence of Mg.

The isomerizations were performed as described in Example 1. The following parameters were kept constant during the experimental series:

| | |
|---|---|
| glucose conc. | 40% w/w |
| pH inlet | 8.5 |
| $Co^{++}$ addition | none |
| $Ca^{++}$ conc. | less than $2.5 \times 10^{-5}$M |
| Temperature | 65° C. |
| Magnesium addition varied from $0 - 8 \times 10^{-3}$M | |

After 450 hours of isomerization the experiments were interrupted. The residual activity was determined, and productivity per 100 IGIC/g and the contact time per 100 IGIC/g were calculated. The results are listed in the following table:

TABLE 2

| | | $Mg^{++}$ addition, M | | | | |
|---|---|---|---|---|---|---|
| Column | Performance | 0 | $4 \times 10^{-4}$ | $8 \times 10^{-4}$ | $4 \times 10^{-3}$ | $8 \times 10^{-3}$ |
| 60 ml | Productivity per 100 IGIC/g | 400 | 419 | 424 | 415 | 420 |
| | Residual activity | 50% | 50% | 50% | 48% | 52% |
| | Contact time, min per 100 IGIC/g | 75–150 | 75–150 | 75–150 | 75–155 | 75–145 |
| 1 l | Productivity per 100 IGIC/g | 410 | 435 | 435 | 450 | 440 |
| | Residual activity | 58% | 60% | 62% | 62% | 60% |
| | Contact time, min per 100 | | | | | |

TABLE 2-continued

| | | Mg$^{++}$ addition, M | | | | |
|---|---|---|---|---|---|---|
| Column | Performance | 0 | $4\times10^{-4}$ | $8\times10^{-4}$ | $4\times10^{-3}$ | $8\times10^{-3}$ |
| | IGIC/g | 75–130 | 75–125 | 75–125 | 72–125 | 78–125 |

It appears from the table that the addition of Mg$^{++}$ does not affect the productivity per 100 IGIC/g or the residual activity.

EXAMPLE 3

Isomerization with varying proportions between Mg$^{++}$ and Ca$^{++}$.

The isomerizations were performed according to the description given in Example 1. Five 60 ml columns were used simultaneously, one with constant Mg$^{++}$ addition to the feed syrup and no Ca$^{++}$, and the other with varying proportions between Mg$^{++}$ and Ca$^{++}$ in the glucose syrup.

The following parameters were used:

| | |
|---|---|
| 40 w/w % glucose | (40 w/w%) |
| pH 8.4 in inlet | (8.4) |
| 65° C. | (65° C.) |
| 0 M Co$^{++}$ | (0 M Co) |
| variable Mg$^{++}$ | ($4\times10^{-3}$M Mg$^{++}$) |
| variable Ca$^{++}$ | less than $2.5\times10^{-5}$M |

The activity in the control column (without Ca) was measured using the values of the parameters indicated in parentheses. After 800 hours of operation the control column enzyme had declined to 25% of its initial activity. The figures in the following table are the percentage activities relative to the enzymatic activity of the control column after being operated the same number of hours:

TABLE 3

| Hours | $\frac{Mg}{Ca}=1.4$ | Hours | $\frac{Mg}{Ca}=2.8$ | Hours | $\frac{Mg}{Ca}=4.2$ | Hours | $\frac{Mg}{Ca}=8.4$ |
|---|---|---|---|---|---|---|---|
| 1 | 100 | 1 | 100 | 1 | 100 | 1 | 100 |
| 20 | 94 | 20 | 96 | 20 | 99 | 20 | 100 |
| 45 | 56 | 40 | 96 | 60 | 96 | 100 | 100 |
| 70 | 60 | 60 | 94 | 120 | 89 | 200 | 89 |
| 100 | 52 | 90 | 86 | 180 | 84 | 240 | 92 |
| 120 | 52 | 120 | 79 | 240 | 81 | 300 | 83 |
| | | 135 | 80 | | | 420 | 78 |

t ½ = ≃ 100 hrs. t ½ = 300 hrs. t ½ = ≃ 800 hrs. t ½ > 1000 hrs.

The above tabulated results demonstrate that the Mg$^{++}$/Ca$^{++}$ ratio is significant to enzyme life; the ratio should exceed 5 and preferably 10.

EXAMPLE 4

Isomerization dependence of glucose concentration in feed syrup.

The isomerizations were performed as described in Example 1.

The following parameters were used:

| | |
|---|---|
| glucose concentration | variable between 40–50% w/w |
| pH inlet | 8.4 |
| temperature | 65° C. |
| Co$^{++}$ | none |
| Mg$^{++}$ | 0.004 M |
| Ca$^{++}$ | less than $2.5\times10^{-5}$M |

In the following table productivity, residual activity and contact time are listed for 450 hours performance in 60 ml columns.

TABLE 4

| Glucose %, w/w | 40% | 45% | 50% |
|---|---|---|---|
| Productivity/100 IGIC/g | 430 | 410 | 380 |
| Residual activity | 48% | 50% | 50% |
| Contact time, min/100 IGIC/g | 75–150 | 85–170 | 95–190 |

EXAMPLE 5

Influence of pH on activity.

The influence of pH on the activity of the immobilized glucose isomerase prepared as described in Example 2 in Ser. No. 501,292, now U.S. Pat. No. 3,980,521, was determined in a continuous plug flow column with the dimensions 2.5 cm × 35 cm. The isomerization was performed as described in Example 1. Each activity measurement was performed in the following way. Five hours were allowed for the column to reach equilibrium before the activity was measured. Then the pH of the feed was changed to the next value, whereafter the column was run for another 5 hours, and so on. The following parameters were used:

| | |
|---|---|
| Glucose conc. | 40% |
| pH | variable between 5.0–9.5 |
| temperature | 65° C. |
| Co$^{++}$ | none |
| Mg$^{++}$ | 0.004 M |
| Ca$^{++}$ | less than $2.5\times10^{-5}$M |
| Contact time | 50 min. |

The relative percentage activities appear from the following table, the maximum activity at pH 8.5 being defined as 100:

TABLE 5

| pH | 5.0 | 5.5 | 6.0 | 6.5 | 7.0 | 7.5 | 8.0 | 8.5 | 9.0 | 9.5 |
|---|---|---|---|---|---|---|---|---|---|---|
| % activity | 5 | 15 | 45 | 60 | 70 | 85 | 95 | 100 | 95 | 90 |

EXAMPLE 6

Dependence of temperature on activity and stability.

The isomerizations were performed as described in Example 1 with glucose isomerase produced as described in Example 2 of Ser. No. 501,292, now U.S. Pat. No. 3,980,521. Seven columns were run isothermically at different temperatures in the range from 60°–90° C. The initial activity was measured as well as the half life (as the time necessary to reduce the activity to 50% of the initial activity).

The following parameters were used:

| | |
|---|---|
| Glucose conc. | 40% w/w |
| pH | 8.5 |
| temperature | variable |
| $Co^{++}$ | none |
| $Mg^{++}$ | 0.004 M |
| $Ca^{++}$ | less than $2.5\times10^{-5}$M |

The following results were obtained:

| Temp. | % activity | Stability (Half life) | Contact time (min) per 100 IGIC/g |
|---|---|---|---|
| 60° C. | 25% | 600 hours | 90–180 |
| 65 | 30% | 450 hours | 75–150 |
| 70 | 40% | 250 hours | 55–110 |
| 75 | 55% | 125 hours | 40–80 |
| 80 | 70% | 60 hours | 30–60 |
| 85 | 90% | 10 hours | 25–50 |
| 90 | 100% | 2 hours | 23–45 |

EXAMPLE 7

Influence of particle size on activity.

Except for the enzyme preparations the isomerizations were performed as described in Example 1. In this example, two enzyme preparations were used, i.e. the immobilized glucose isomerase preparations described in Examples 2 and 3, last alternative in Ser. No. 501,292, now U.S. Pat. No. 3,980,521, designated X and Y respectively. Before the enzyme preparations were packed in columns they were both classified.

The following parameters were used:

| | |
|---|---|
| Glucose conc. | 40 % w/w |
| pH | 8.0 |
| temperature | 65° C. |
| $Co^{++}$ | None |
| $Mg^{++}$ | 0.004 M |
| $Ca^{++}$ | less than $2.5\times10^{-5}$M |

The effect of particle size on the activity of preparations X and Y appears from the following table:

TABLE 7

| Glucose isomerase preparations X Particle size distribution | % Activity |
|---|---|
| 150–297μ | 100% |
| 297–500μ | 98% |
| 500–1000μ | 97% |
| 1000–1410μ | 94% |
| 1410–2000μ | 84% |
| 2000–2800μ | 80% |
| **Gluclose isomerase preparations Y Particle size distribution** | **% Activity** |
| 75–250μ | 100% |
| 250–354μ | 69% |
| 354–500μ | 48% |
| 500–707μ | 39% |
| 707–1000μ | 34% |

It was found that the stability did not depend significantly on the particle size. As appears from the above figures the activity of some preparations are more dependent on particle size than others. It is not understood completely why the activity of the X preparations varies much less with particle size than the activity of the Y preparations. However, it is believed that this phenomenon is connected to the particle shape. It has been found that the X preparation mainly consists of slabs, whereas the Y preparation mainly consists of spheres. The average pore length in the slabs for a given particle size are considerably smaller than the average pore length in the spheres for the same particle size, and this could explain that the activity generally is smaller for the Y preparation than for the X preparation.

EXAMPLE 8

Color formation

The isomerizations were performed as in Example 1. Six columns were filled with varying amounts of enzyme to keep conversion degree and contact time constant at 45% and 1 hour respectively. The following parameters were used:

| | |
|---|---|
| Glucose concentration | 45% w/w |
| pH | 8.5 |
| temperature | variable |
| $Co^{++}$ | none |
| $Mg^{++}$ | $8\times10^{-4}$M |
| $Ca^{++}$ | less than $2.5\times10^{-5}$M |

Icumsa color index increases as stated below were found after approximately 100 hours of isomerization:

TABLE 8

| Temperature | Icumsacolour Index |
|---|---|
| 60° C. | 24 |
| 65° C. | 25 |
| 70° C. | 26 |
| 75° C. | 30 |
| 80° C. | 39 |
| 85° C. | 65 |

$$\text{Icumsa color} = 10^3 \times \frac{a}{b \times c}$$

where a is $OD_{420}$ (optical density)

b is DS in g/ml (dry substance)

c is measuring cell length in centimeters

EXAMPLE 9

Influence of column size (upscaling).

Except for the enzyme preparation the isomerization was performed as in Example 1. The enzyme was produced according to Example III, last alternative, in Ser. No. 501,292, now U.S. Pat. No. 3,980,521. The particle size was between 150 to 500μ. The parameters used are listed in the following table:

TABLE 9

| Column size | 60ml | 1 l | 50 l |
|---|---|---|---|
| No. of columns | 1 | 1 | 1 |
| Dimensions, height in cm × diameter in cm | 35 × 1.5 | 45 × 5.8 | 188 × 20 |
| Grams of enzyme used | 20 | 470 | 23000 |
| Temperature isothermal | 65° C. | 65° C. | 65° C. |
| Glucose concentration | 40% | 40% | 40% |
| pH feed | 8.5 | 8.5 | 8.5 |
| Mg Molar | 0.0008 | 0.0008 | $8\times10^{-4}$ |
| $Co^{++}$ | None | None | None |
| $Ca^{++}$ | less than $2.5\times10^{-5}$M | less than $2.5\times10^{-5}$M | less than $2.5\times10^{-5}$M |
| Total isomerization hours | 450 | 450 | 450 |

The following results were obtained:

| Column size | 60 ml | 1 l | 50 l |
|---|---|---|---|
| Productivity/100 | | | |
| IGIC/g | 440 | 420 | 455 |
| Residual activity | 50% | 53% | 60% |
| Contact time/100 | | | |
| ICIC/g (min) | 75–150 | 75–150 | 75–140 |

It appears from the above figures that upscaling of the isomerization process from the 60 ml column can be performed without any difficulties and with essentially the same values for productivity and residual activities.

What is claimed is:

1. A continuous process for isomerizing glucose syrup to a glucose fructose mixture which comprises passing a 30–55% by weight of a starch hydrolysate glucose syrup which contains not more than $10^{-3}$M $Ca^{++}$ and $10^{-2}$M $Mg^{++}$, and where the molar ratio $Mg^{++}:Ca^{++}$ is between 5–500:1 for $Mg^{++} > 10^{-3}$M, through a bed of glutaraldehyde immobilized and cross-linked glucose isomerase particles exceeding about 100 microns derived from the raction of ruptured cells of *B*, coagulans with glutaraldehyde at an inlet pH in the range of pH 7.8–8.6 at temperatures in the range of 60°–85° C. for a total contact time of less than 3.5 hours, and isomerizing the syrup thereby to at least 40% fructose by weight of the glucose fructose content.

2. The process of claim 1 wherein added $Co^{++}$ is absent from the glucose syrup.

3. The process of claim 1 wherein the $Ca^{++}$ is less than about $2.5 \times 10^{-5}$M and the $Mg^{++}$ is less than about $5 \times 10^{-4}$M, the $Mg^{++}$ content being at least 10 times the $Ca^{++}$ content.

4. The process of claim 2 wherein the particulate glucose isomerase enzyme is disposed in column.

5. The process of claim 1 wherein the contact time is less than about 2 hours.

6. The process of claim 1 which comprises conducting the process with a syrup containing 40–45% by weight of glucose.

7. The process of claim 1 which comprises conducting the process at at temperature between 60° and 70° C.

8. The process of claim 1 wherein the *B*, coagulans is an atypical strain of *B*, coagulans characterized by the ability to grow solely on inorganic nitrogen as the nitrogen nutrient.

9. The process of claim 1 wherein the molar ratio $Mg^{++}:Ca^{++}$ exceeds 5:1 when $Mg^{++}$ content is not more that $10^{-3}$M.

* * * * *